April 14, 1931.     C. A. CARLSON     1,800,603
ILLUMINATED LICENSE PLATE
Filed May 11, 1927    2 Sheets-Sheet 1
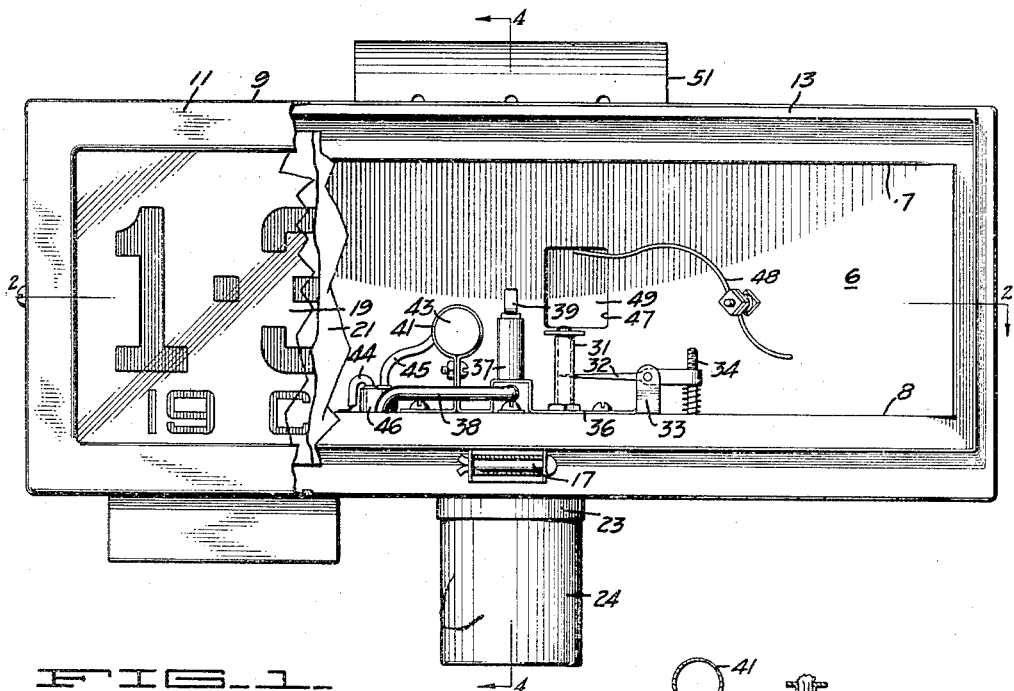
FIG. 1.
FIG. 3.
FIG. 2.
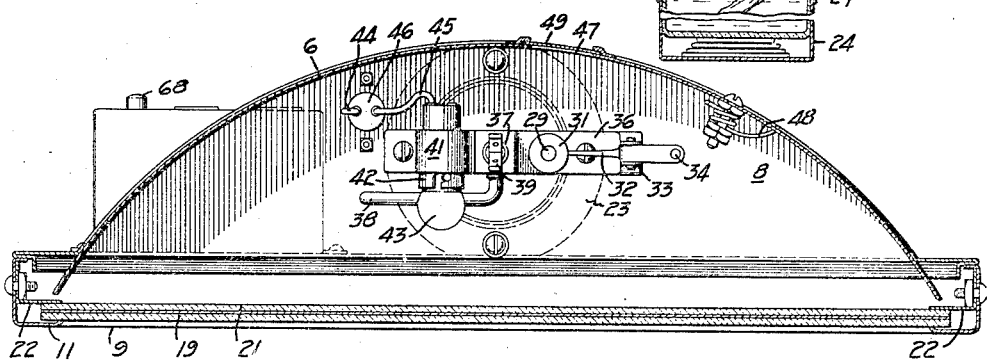
INVENTOR
*Carl A. Carlson*
BY
*White, Prost & Fryer*
*his* ATTORNEYS April 14, 1931.    C. A. CARLSON    1,800,603
ILLUMINATED LICENSE PLATE
Filed May 11, 1927    2 Sheets-Sheet 2
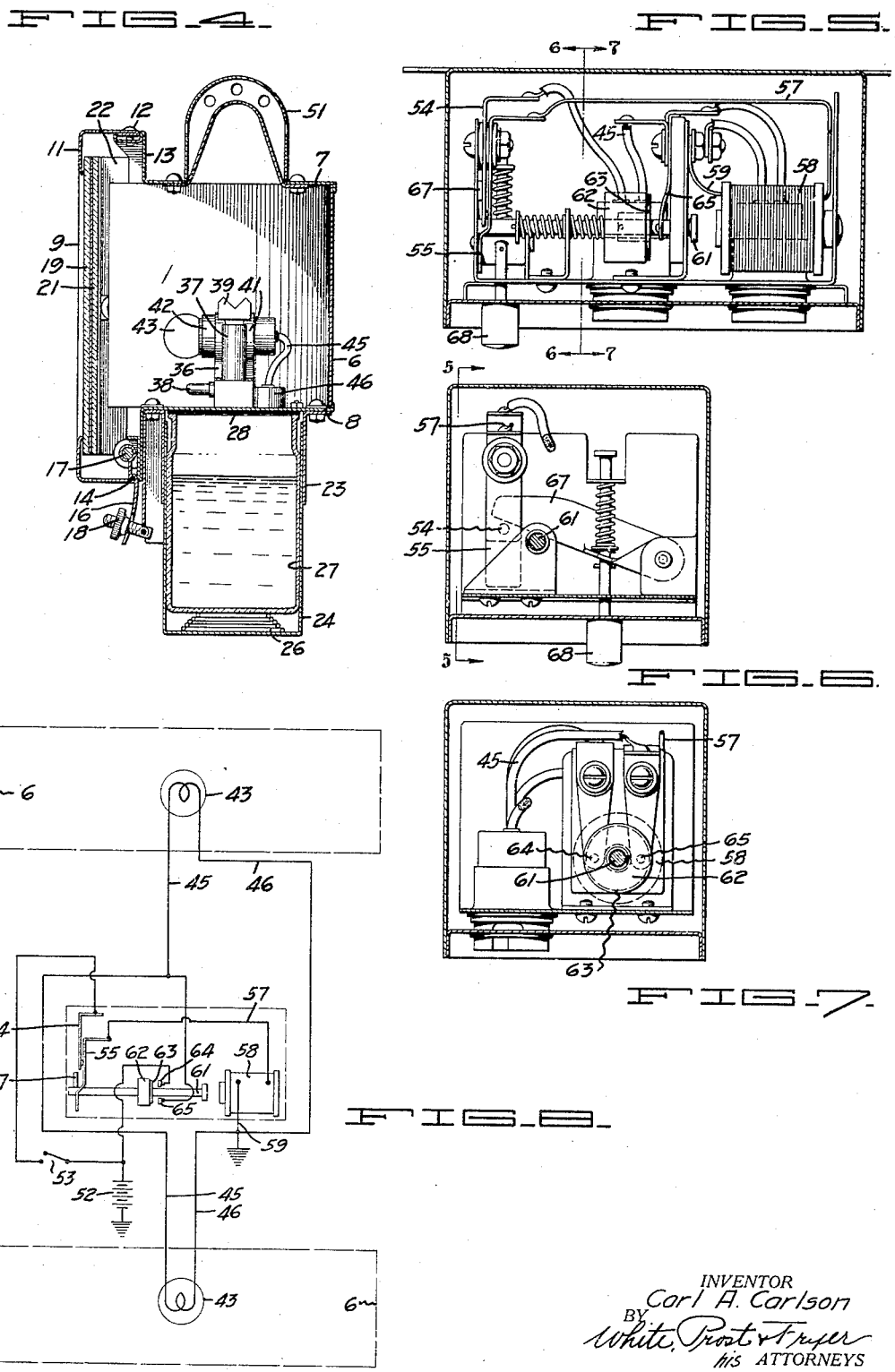
INVENTOR
Carl A. Carlson
BY
White, Prost & Fryer
his ATTORNEYS Patented Apr. 14, 1931

1,800,603

UNITED STATES PATENT OFFICE

CARL A. CARLSON, OF SAN FRANCISCO, CALIFORNIA

ILLUMINATED LICENSE PLATE

Application filed May 11, 1927. Serial No. 190,435.

My invention relates particularly to license plates such as are used on automobiles and refers particularly to means for rendering the license numbers contained on the plate readily visible at night.

An object of my invention is to provide an illuminated license plate which is adapted for use with all types of vehicles.

Another object of my invention is to provide an illuminated license plate in which the license number is cheaply and effectively installed.

An additional object of my invention is to provide means whereby the license plate once illuminated cannot be extinguished from within the vehicle to which it is attached.

My invention possesses other advantageous features, some of which with the foregoing, will be set forth at length in the following description where I shall outline in full that form of the illuminated license plate of my invention, which I have selected for illustration in the drawings accompanying and forming part of the present specification. In said drawings, I have shown one form of the license plate embodying my invention, but it is to be understood that I do not limit myself to such form since the invention as set forth in the claims, may be embodied in a plurality of forms.

In the drawings:

Fig. 1 is a front elevation of one form of the illuminated license plate of my invention, portions being broken away to reveal the interior thereof.

Fig. 2 is a transverse section of the illuminated license plate, the plane of section being indicated by the line 2—2 of Fig. 1.

Fig. 3 is a longitudinal section of a fragmentary portion of the burner portion of my license plate.

Fig. 4 is a cross section of the illuminated license plate, the plane of section being indicated by line 4—4 of Fig. 1.

Fig. 5 shows in elevation the interior of a preferred form of electric switch for use with the license plate.

Fig. 6 is a cross section on the line 6—6 of Fig. 5.

Fig. 7 is a cross section on the line 7—7 of Fig. 5.

Fig. 8 is a circuit diagram disclosing the method of installation of the electric switch.

The illuminated license plate of my invention preferably comprises a housing provided with a source of illumination to illuminate a license number preferably printed on a piece of translucent paper and includes an electric switch which preferably can be energized from the driver's position in the vehicle but cannot be deenergized from that position.

Most localities require vehicles, such as automobiles, to have a license number or license plate exposed at the front and at the rear of each vehicle. I therefore preferably provide a pair of housings for containing the illuminated license plate of my invention and since the housings are preferably identical I shall describe but one of them. Each housing 6, preferably comprises an arcuate rear wall and top and bottom walls 7 and 8, respectively. The remaining portion of the housing is closed by a door 9, which includes a frame 11 of metallic shapes suitably secured together. The frame is provided along its upper edge with a number of pins 12 adapted to seat in cooperating apertures formed in a bracket 13 secured to the top wall 7. The lower end of the frame is secured by a pivot 14 to a latch 16, in turn pivoted, as at 17, to the housing 6. The lower end of the latch is notched and is engaged by an adjustable thumb wheel 18. When the thumb wheel is released, a lifting motion of the latch 16 raises the door and permits the pins 12 to be lifted from the bracket 13 thereby permitting the entire door to swing downwardly. The door frame preferably carries the license number and is provided with a spaced pair of sheets 19 and 21 of translucent material preferably glass. The sheets are clamped in the frame 11 by readily removable brackets 22. The license number is preferably printed on translucent paper by means of a semi-opaque pigment and the printed sheet is retained in position by being held between the two sheets 19 and 21. The license number being enclosed between two sheets of glass is protected from the climate and being easily printed on paper, its cost of production is slight.

Means are provided for illuminating the license number and preferably include a plurality of sources of light. The several sources of illumination are usually not operated simultaneously but are preferably of different kinds to render the illuminated license plate adaptable to a variety of vehicles. Most automobiles are provided with an electric lighting system which will permit the use of an electric light globe, but other vehicles, such as trucks and trailers are not always so provided and acetylene gas or coal-oil must be used for illumination purposes. Preferably, therefore, I provide three sources of illumination so that my illuminated license plate can be immediately attached to any type of vehicle.

The lower wall 8 of the housing, is apertured adjacent its center within the confines of a surrounding collar 23. The collar is adapted to make a bayonet connection with a receiver 24 of generally cylindrical shape which carries a spring in its bottom to support a container 27 for kerosene. The container can conveniently be a glass jar making a snug fit within the receiver 24 and carrying at its upper rim a gasket 28 to preclude possibility of leakage. Into the receptacle 27, a wick 29 projects. The wick extends into a cylindrical barrel 31 upstanding from the bottom 8 of the casing and registering with the aperture thru which the wick passes. A needle 32 extends thru a slot in the side of the barrel 31 and engages the wick. A fulcrum 33 is provided for the needle to permit a hand or finger adjustment 34 to alter the height of the wick. The bayonet connection makes it a simple matter to detach the container 27 to replenish the supply of kerosene. A strap 36 having an offset portion therein is provided as a base for the acetylene burner and is suitably apertured to be gripped by the burner 37. A tube 38 passing to a suitable source of acetylene, not shown, enters the base of the burner 37 and supplies gas to the burner tip 39 of the conventional kind.

Along side the burner 37 and forming part of the strap 36 is an adjustable loop 41 of a suitable size to grip a socket 42 for an electric light globe 43. Electrical conductors 44 and 45 extend from the socket 46 secured in the housing 6 and making suitable electrical connections with the globe 43. In the wall 6 of the housing adjacent the kerosene and acetylene burners, an aperture 47 is cut to permit the insertion of a match or other lighting means. A spring 48 normally closes a sliding door 49 closing the aperture 47. In the top 7 of the housing above the kerosene and acetylene burners a vent 51 is provided to permit the ready escape of products of combustion.

Any one of the three described sources of illumination can be utilized to give a sufficient amount of light to the license plate to permit its being read readily at night. I preferably use the electric lights, but in instances where there is no electrical system or in which it is desired to conserve electricity, the acetylene or kerosene burners will be found very advantageous.

In conjunction with the electric light, I preferably employ an electrical circuit which is arranged to permit the license plate to be illuminated by a control convenient to the driver of the vehicle and preferably installed in the driver's compartment, but which renders it impossible to extinguish the illumination without having access to the license plate housing. This is especially advantageous to prevent people operating vehicles after dark without properly illuminated license plates and secondly to prevent them from extinguishing their lighted license plates without first being forced to bring the vehicle to a halt. This system is intended primarily to hinder hit-run drivers.

The circuit diagram for such an electrical system is disclosed particularly in Fig. 8 in which I have indicated two license plate housings 6 provided with electric globes 43. In the circuit of each globe is preferably a storage battery 52 which is connected to a pair of movable contacts 54 and 55 by means of a manually operated switch 53, preferably located convenient to the vehicle driver. Ordinarily the fingers 54 and 55 are sufficiently resilient to remain in contact and permit the passage of current. From the contact 55 a wire 57 leads thru an electromagnetic coil 58 to a conductor 59 connected thru the ground to the battery 52. When the switch 53 is closed, the electro-magnet 58 is energized and attracts an armature 61 mounted to be translated axially. The armature carries intermediate its ends a collar 62 on which a conducting disc 63 is situated. The conducting disc is adapted to bridge a pair of contacts 64 and 65 one of which is connected to the battery and the other of which leads to the conductors 45 connected to the lights 43. When the electro-magnet is energized, the armature is axially displaced and the contact disc 63 completes the circuit thru contacts 64 and 65 permitting current to flow from the battery and energize both globes 43.

Means are provided for retaining the contact disc 63 in touch with the points 64 and 65 even though the electro-magnet 58 may not be energized. A pivoted latch 67 is spring-pressed to drop across the end of the armature 61 as soon as the armature has been displaced toward the electro-magnet. The latch therefore prevents return axial movement of the armature and at the same time displaces the contact 55 to open the circuit between the contact 55 and the contact 54. The circuit is therefore completed thru the contacts 64 and 65 to the lights 43 and any manipulation of the switch 53 is ineffective to extinguish the lights. The vehicle operator is consequently powerless to extinguish the lights from his seat. The spring-pressed latch 67 is provided with a manually operable release 68 located remotely from the driver's compartment and preferably situated on the housing 6. Operation of the release 68 returns the latch 67 to its initial position against the action of a spring, permits the contacts 54 and 55 again to touch and opens the contact between the disc 63 and the points 64 and 65. The system is therefore immediately returned to its initial position so that the vehicle operator can energize or illuminate the license plates from his seat. It is, however, necessary for him to leave his seat and extinguish the license plate globes by manipulating the manual release 68 located on the license casing. It is therefore impossible for a hit-run driver to extinguish his lights and steal away from the scene of an accident without first stopping his car to do so.

My invention has therefore been described as an illuminated license plate which includes a cheaply produced license number illuminated for better vision both at night and in the daytime and provided not only with means rendering it immediately attachable to and operable on any type of vehicle, but also preventing interruption of the license plate illumination except by a person proximate the license plate housing.

I claim:

1. An illuminated license plate comprising a housing having an arcuate rear wall, a pair of translucent plates forming one side of said housing opposite said rear wall, a sheet of paper bearing printed indicia interposed between said plates, said housing having a flat bottom wall, a source of light fixedly mounted on said bottom wall in said housing between said arcuate wall and said plates, a fuel receiver for said light source, means for detachably securing said receiver to said housing exteriorly of said housing.

2. An illuminated license plate comprising a housing having an arcuate rear wall, a flat bottom wall, a translucent plate bearing indicia carried by the front wall, a depending collar mounted on said bottom wall exteriorly of the housing, a fuel receiver detachably carried by said collar exteriorly of said housing and an illumination fuel burner fixedly carried by said bottom wall interiorly of the housing.

3. An illuminated license plate comprising a housing having an arcuate rear wall, a flat bottom wall, a translucent plate bearing indicia carried by the front wall, and an integral strap fixedly carried by said bottom wall interiorly of the housing and supporting a liquid fuel light, a gaseous fuel light, and an electric light.

In testimony whereof, I have hereunto set my hand.

CARL A. CARLSON.